US011267062B2

(12) United States Patent
Kennedy et al.

(10) Patent No.: US 11,267,062 B2
(45) Date of Patent: Mar. 8, 2022

(54) SYSTEM AND METHOD FOR COMPENSATING FOR THERMAL EXPANSION CAUSED BY SOLDERING PROCESS

(71) Applicant: Dell Products L.P., Round Rock, TX (US)

(72) Inventors: Brian D. Kennedy, Rutland, MA (US); Stephen E. Strickland, Foxborough, MA (US)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 16/890,658

(22) Filed: Jun. 2, 2020

(65) Prior Publication Data

US 2021/0370428 A1 Dec. 2, 2021

(51) Int. Cl.
*B23K 1/00* (2006.01)
*B23K 3/00* (2006.01)
*B23K 1/19* (2006.01)
*G01K 3/12* (2006.01)
*H05K 3/34* (2006.01)
*B23K 101/42* (2006.01)

(52) U.S. Cl.
CPC ............ *B23K 1/19* (2013.01); *G01K 3/12* (2013.01); *H05K 3/3426* (2013.01); *B23K 2101/42* (2018.08)

(58) Field of Classification Search
CPC .. B23K 1/0016; B23K 3/087; B23K 2101/40; B23K 31/12; B23K 3/00
See application file for complete search history.

(56) References Cited

U.S. PATENT DOCUMENTS

| 5,811,317 | A | * | 9/1998 | Maheshwari | H01L 21/563 |
| | | | | | 29/827 |
| 6,020,221 | A | * | 2/2000 | Lim | H01L 23/04 |
| | | | | | 257/E23.181 |
| 2007/0099412 | A1 | * | 5/2007 | Miyazaki | H01L 24/81 |
| | | | | | 438/612 |
| 2014/0138824 | A1 | * | 5/2014 | Zhang | H01L 24/16 |
| | | | | | 257/738 |
| 2015/0303122 | A1 | * | 10/2015 | Malofsky | H01L 24/09 |
| | | | | | 257/777 |
| 2016/0276237 | A1 | * | 9/2016 | Lin | H01L 24/11 |
| 2021/0066227 | A1 | * | 3/2021 | Chipalkatti | H01L 24/06 |

* cited by examiner

*Primary Examiner* — Erin B Saad
(74) *Attorney, Agent, or Firm* — Baker Botts L.L.P.

(57) ABSTRACT

Systems and methods are disclosed that may include identifying a first coefficient of thermal expansion for a first component, the first component including component pins having a first pitch value; identifying a second coefficient of thermal expansion for a second component, the second component associated with electrically conductive pads; determining a relative expansion value based on the first coefficient of thermal expansion and the second coefficient of thermal expansion; determining a change in temperature value of the first component and the second component, the change in temperature value indicating a change in temperature caused by a soldering process; and determining a second pitch value for the electrically conductive pads based on a product of the relative expansion value, the first pitch value, and the change in temperature value, the second pitch value causing an alignment between the component pins and the electrically conductive pads during the soldering process.

20 Claims, 6 Drawing Sheets

400

```
┌─────────────────────────────────────────────────────────────┐
│ IDENTIFY FIRST COEFFICIENT OF THERMAL EXPANSION (CTE) FOR FIRST │
│                MATERIAL OF FIRST COMPONENT.                 │
│                            410                              │
└─────────────────────────────────────────────────────────────┘
                              │
                              ▼
┌─────────────────────────────────────────────────────────────┐
│     IDENTIFY SECOND CTE FOR SECOND MATERIAL OF SECOND       │
│                         COMPONENT.                          │
│                            420                              │
└─────────────────────────────────────────────────────────────┘
                              │
                              ▼
┌─────────────────────────────────────────────────────────────┐
│  DETERMINE RELATIVE EXPANSION VALUE BASED ON FIRST CTE AND  │
│                         SECOND CTE.                         │
│                            430                              │
└─────────────────────────────────────────────────────────────┘
                              │
                              ▼
┌─────────────────────────────────────────────────────────────┐
│  DETERMINE CHANGE IN TEMPERATURE VALUE OF FIRST COMPONENT   │
│                    AND SECOND COMPONENT.                    │
│                            440                              │
└─────────────────────────────────────────────────────────────┘
                              │
                              ▼
┌─────────────────────────────────────────────────────────────┐
│  DETERMINE SECOND PITCH VALUE FOR ELECTRICALLY CONDUCTIVE   │
│                 PADS OF SECOND COMPONENT.                   │
│                            450                              │
└─────────────────────────────────────────────────────────────┘
```

FIG. 4

SYSTEM AND METHOD FOR COMPENSATING FOR THERMAL EXPANSION CAUSED BY SOLDERING PROCESS

BACKGROUND

Field of the Disclosure

The disclosure relates generally to information handling systems, and in particular to a system and method for compensating for thermal expansion caused by a soldering process.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for compensating for thermal expansion caused by a soldering process may include: identifying a first coefficient of thermal expansion (CTE) for a first material of a first component, the first component including a plurality of component pins having a first pitch value; identifying a second CTE for a second material of a second component, the second component associated with a plurality of electrically conductive pads; determining a relative expansion value based on the first CTE and the second CTE; determining a change in temperature value of the first component and the second component, the change in temperature value indicating a change in temperature caused by the soldering process; and determining a second pitch value for the plurality of electrically conductive pads based on a product of the relative expansion value, the first pitch value, and the change in temperature value, the second pitch value causing an alignment between the plurality of component pins and the plurality of electrically conductive pads during the soldering process.

In one or more of the disclosed embodiments, the method further includes disposing the plurality of electrically conductive pads on a surface of the second component based on the second pitch value.

In one or more of the disclosed embodiments, determining the relative expansion value includes determining a difference between the first CTE and the second CTE.

In one or more of the disclosed embodiments, determining the change of temperature value includes determining a difference between a first temperature value and a second temperature value, the first temperature value associated with a room temperature, the second temperature value associated with the soldering process.

In one or more of the disclosed embodiments, determining the second pitch value includes: determining that the second CTE is greater than the first CTE; and in response to determining that the second CTE is greater than the first CTE, subtracting the product from the first pitch value.

In one or more of the disclosed embodiments, determining the second pitch value includes: determining that the second CTE is less than the first CTE; and in response to determining that the second CTE is less than the first CTE, adding the product to the first pitch value.

In one or more of the disclosed embodiments, the first component is a surface-mount component.

In one or more of the disclosed embodiments, the second component is a printed circuit board (PCB).

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 4 is a flowchart depicting selected elements of an embodiment of a method for compensating for thermal expansion caused by a soldering process.

DESCRIPTION OF PARTICULAR EMBODIMENT(S)

Figure 1:
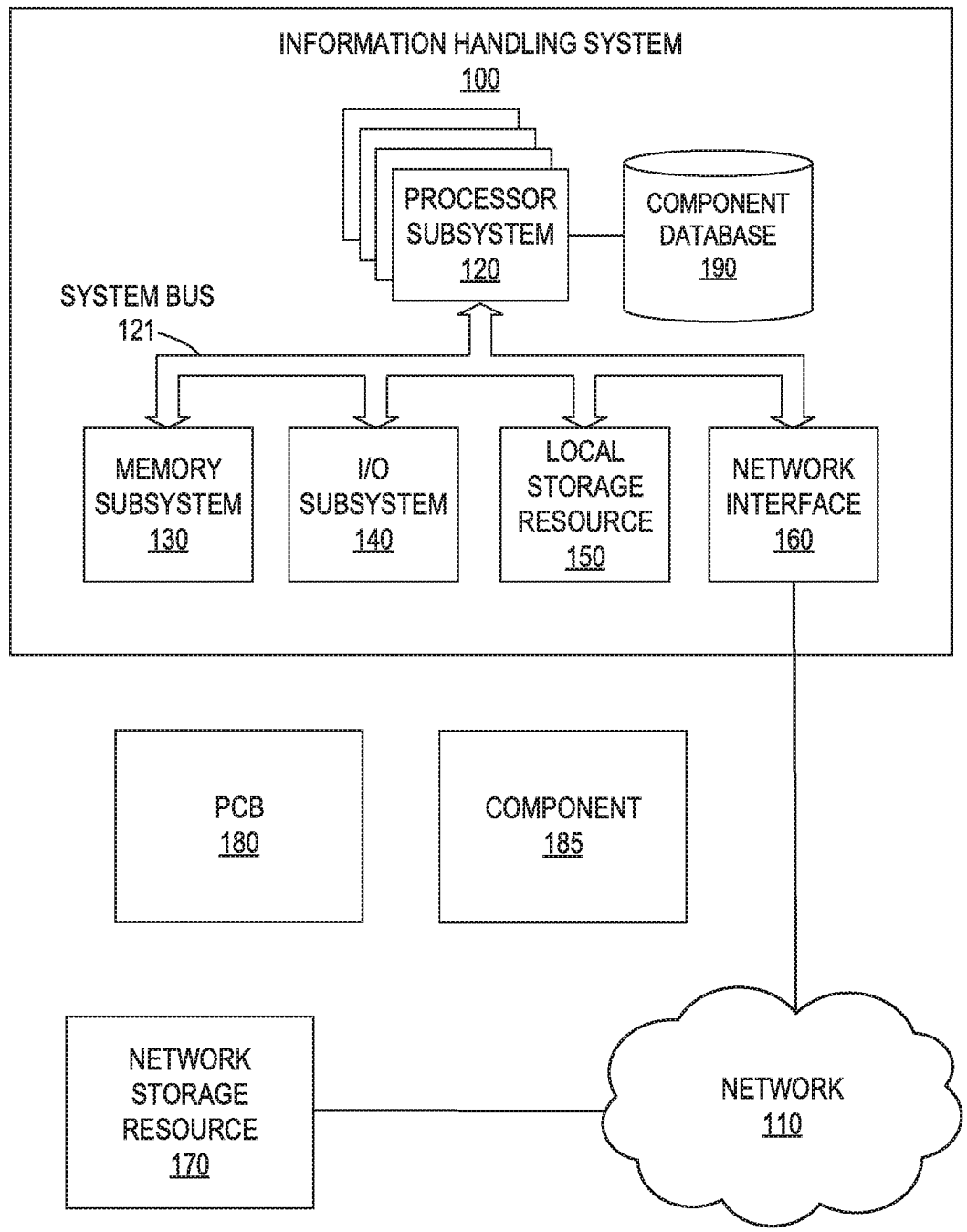
FIG. 1 is a block diagram of selected elements of an embodiment of an information handling system that includes a printed circuit board (PCB) and a component.

This document describes a method for compensating for thermal expansion caused by a soldering process that may include: identifying a first coefficient of thermal expansion (CTE) for a first material of a first component, the first component including a plurality of component pins having a first pitch value; identifying a second CTE for a second material of a second component, the second component associated with a plurality of electrically conductive pads; determining a relative expansion value based on the first CTE and the second CTE; determining a change in temperature value of the first component and the second component, the change in temperature value indicating a change in temperature caused by the soldering process; and determining a second pitch value for the plurality of electrically conductive pads based on a product of the relative expansion value, the first pitch value, and the change in temperature value, the second pitch value causing an alignment between the plurality of component pins and the plurality of electrically conductive pads during the soldering process.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In information handling system 100, component database 190 may comprise a system, device, or apparatus generally operable to store component information. In particular, component database 190 may store component information associated with printed circuit board (PCB) 180 and component 185. In one embodiment, component information may include a coefficient of thermal expansion (CTE) of material comprising component 185, or components, and a CTE of material comprising PCB 180, or PCBs. Component 185 may include component pins (not shown in figure) extending from one or more sides of component 185 that each include a uniform gap, or "pitch value," between adjacent component pins. Similarly, PCB 180 may be associated with electrically conductive pads on a surface of PCB 180 that each include a uniform pitch value between adjacent electrically conductive pads. Here, the pitch value between adjacent component pins and the pitch value between adjacent electrically conductive pads may be stored in component database 190 as component information. In addition, component information stored in component database 190 may include a numeric value, or a "change in temperature value," indicating a change in temperature required to perform a soldering process. For example, a reflow soldering process may cause an overall change in temperature value of 195° C. as one or more components are introduced to a controlled heat source of 220° C. from a room temperature of 25° C. In one embodiment, component database 190 may be comprised of one or more tables in which component information for each component, and/or PCB, is stored as an entry. For example, an entry for component 185 in component database 190 may include a CTE of the material comprising component 185, a pitch value between adjacent component pins of component 185, and a change in temperature value indicating a change in temperature required for component 185 to undergo a soldering process. In one embodiment, component database 190 may be or include a relational database in which component information for each component, and/or PCB, is stored as an entry. In other embodiments, component database 190 may be or include a centralized database, distributed database, commercial database, operational database, and/or any other database management system suitable for storing component information.

In one embodiment, PCB 180 may comprise a system, device, or apparatus generally operable to mechanically support and electrically couple electrical components (e.g., component 185) using conductive tracks and pads etched from one or more sheet layers of electrically conductive material (e.g., copper). The sheet layers of electrically conductive material may be laminated onto, or in-between, one or more sheet layers of non-conductive substrate (e.g., fiberglass). Electrical components may be soldered onto a surface of PCB 180 to both electrically couple and mechanically fasten the electrical components to PCB 180. Specifically, PCB 180 may include electrically conductive pads (not shown in figure) disposed on a surface of PCB 180 such that component pins of an electrical component may align with the electrically conductive pads to be electrically coupled to the electrically conductive pads during a soldering process. It is noted that although a single PCB 180 is illustrated in FIG. 1, computing system 195 may include any number of PCBs suitable for mechanically supporting and electrically coupling electrical components. PCB 180 will be discussed in further detail with respect to FIGS. 2A-3B.

In one embodiment, component 185 may comprise a system, device, or apparatus generally operable to perform a function within an electrical circuit. In particular, component 185 may affect electrons and associated electric fields flowing through component 185 to achieve a specific functionality (e.g., logic, amplification, connectivity, and the like) required for the overall performance of an electrical circuit. In one embodiment, component 185 may be soldered onto a surface of PCB 180. For example, component 185 may be or include a surface-mount electrical component mounted directly to the surface of PCB 180 such that component pins (not shown in figure) extending from one or more sides of component 185 may be soldered to electrically conductive pads disposed on the surface of PCB 180 below. In one embodiment, each component pin extending from component 185 may be soldered to a corresponding electrically conductive pad using a reflow soldering process. Specifically, a solder paste may be used to temporarily couple each component pin to a corresponding electrically conductive pad before the entire assembly is subjected to a controlled heat source (e.g., via a reflow oven, infrared lamp, soldering iron, and the like). In response to an applied heat source, the solder paste reflows while in a molten state and electrically couples each component pin to a corresponding electrically conductive pad of PCB 180. It is noted that although a single component 185 is illustrated in FIG. 1, computing system 195 may include any number of components suitable for performing functions within an electrical circuit. In one embodiment, component 185 may be or include an edge connector. In another embodiment, component 185 may be or include an integrated circuit (IC). In other embodiments, component 185 may be or include an active component, passive component, electromechanical component, and/or any type of component suitable for performing a function within an electrical circuit.

Conventionally, each electrically conductive pad of a PCB may be disposed on a surface of the PCB such that a pitch value between electrically conductive pads corresponds to a pitch value between component pins of a component. Here, the pitch value between electrically conductive pads and the pitch value between component pins may be equal at room temperature prior to applying a heat source such that respective electrically conductive pads and component pins are properly aligned for the soldering process (e.g., reflow soldering process). For example, the pitch value between electrically conductive pads of a PCB and the pitch value between component pins of a component may both be 0.65 mm in length at room temperature, thereby aligning the electrically conductive pads with the component pins. However, high temperatures required for the soldering process (e.g., 220° C.) may cause thermal expansion to occur in the materials comprising both the PCB and the component once a heat source is applied due to different CTE of the materials. This thermal expansion may cause the PCB to expand in dimension such that the electrically conductive pads grow farther apart in relation to one another causing a change in pitch value. Similarly, thermal expansion may cause the component to expand in dimension such that the component pins grow farther apart causing a change in pitch value that may be less than, or greater than, the change in pitch value of the electrically conductive pads. These changes in pitch value may cause the electrically conductive pads and component pins to become misaligned during the soldering process thereby creating misaligned soldering joints and diminishing the reliability of the overall circuit. Further, if the component is large (e.g., greater than 3 inches in length) and the pitch between component pins is small (e.g., less than 0.65 mm), thermal expansion during the soldering process may result in misalignment between component pins and electrically conductive pads in which the component pins are soldered into position more than 50% off the edge of the electrically conductive pads.

In one embodiment, information handling system 100 may compensate for thermal expansion caused by a soldering process. In particular, information handling system 100 may determine a pitch value for electrically conductive pads of PCB 180 that may expand and/or contract such that the electrically conductive pads are properly aligned with a pitch value for component pins of component 185 during the soldering process. That is, rather than properly aligning the respective pitch values of the electrically conductive pads and the component pins prior to the soldering process as described above, information handling system 100 may determine a pitch value for the electrically conductive pads that is less than, or greater than, the pitch value of the component pins causing a misalignment prior to the soldering process and a proper alignment during the subsequent soldering process (i.e., when the electrically conductive pads and the component pins are electrically coupled). To compensate for thermal expansion caused by the soldering process, information handling system 100 may identify a CTE for the material comprising component 185 and a CTE for the material comprising PCB 180 (e.g., by accessing entries stored in component database 190). Information handling system 100 may determine a difference, or a "relative expansion value," between the CTE for the material comprising component 185 and the material comprising PCB 180. Specifically, information handling system 100 may employ the equation below to determine the relative expansion value ($\Delta$CTE).

$$CTE_{component} - CTE_{PCB} = \Delta CTE$$

Here, if $CTE_{PCB}$ is larger than $CTE_{component}$, $\Delta$CTE will have a negative value. For example, a $CTE_{PCB}$ of 20 ppm mm/mm/° C. and a $CTE_{component}$ of 10 ppm mm/mm/° C. will result in a $\Delta$CTE of −10 ppm mm/mm/° C. This negative relative expansion value may indicate that a pitch value of PCB 180 will be less than the pitch value of component 185 to compensate for thermal expansion. In contrast, a positive relative expansion value may indicate that a pitch value of PCB 180 will be greater than the pitch value of component 185 to compensate for thermal expansion given that component 185 has a greater CTE.

In one embodiment, information handling system 100 may receive one or more circuit designs for review (e.g., from a designer and/or manufacturer) to identify potential misalignment between pitch values based on relative expansion value. Specifically, information handling system 100 may receive one or more circuit designs that each include various specifications (e.g., thickness, pitch value, length, part number, and the like) describing a PCB, or PCBs, and components to be integrated thereon. In one embodiment, information handling system 100 may identify the PCB, or PCBs, and the components and determine a respective CTE for each PCB and component included in the circuit design. For example, information handling system 100 may identify respective part numbers for both a PCB and a component and access component database 190 to determine their respective CTE values based on the respective part numbers. Information handling system may determine a relative expansion value ($\Delta$CTE) between a PCB, or PCBs, and each component included in the circuit design as described above. In one embodiment, if information handling system 100 determines that a relative expansion value exceeds a relative expansion threshold value ($\Delta CTE_{threshold}$), information handling system 100 may provide a notification (e.g., via network 110) to a designer and/or manufacturer indicating a potential misalignment between pitch values. In another embodiment, information handling system 100 may determine a pitch value, or pitch values, that compensate for thermal expansion and provide the determined pitch value, or pitch values, to the designer and/or manufacturer such that the potential misalignment between pitch values may be corrected prior to manufacture, thus saving the designer and/or manufacture time and cost.

Information handling system 100 may additionally determine a change in temperature value. In one embodiment, information handling system 100 may access component database 190 to determine the change in temperature value. In another embodiment, information handling system 100 may employ the equation below to determine the change in temperature value ($\Delta$T).

$$T_{solder} - T_{room\ temperature} = \Delta T$$

In one embodiment, information handling system 100 may use the relative expansion value ($\Delta$CTE), the pitch value of component 185 ($L_{component}$), and the change in temperature value ($\Delta$T) to determine a pitch value for PCB 180 ($L_{PCB}$). Specifically, information handling system 100 may employ the equation below to determine pitch value for PCB 180.

$$L_{component}(\Delta CTE \times L_{component} \times \Delta T) = L_{PCB}$$

In the equation above, ($\Delta CTE \times L_{component} \times \Delta T$) yields a product indicating a potential misalignment between the electrically conductive pads of PCB 180 and the component pins of component 185. If the product has a negative value, this may indicate that the electrically conductive pads of PCB 180 could potentially become misaligned with the component pins of component 185 during the soldering process due to a greater CTE of the material comprising PCB 180 than the CTE of the material comprising component 185. This greater CTE of the material comprising PCB 180 may cause the electrically conductive pads to spread farther apart in relation to one another, thereby increasing the pitch value of the electrically conductive pads beyond the pitch value of the component pins. Conversely, if the product has a positive value, this may indicate that the component pins of component 185 could potentially become misaligned with the electrically conductive pads of PCB 180 during the soldering process due to a greater CTE of the material comprising component 185 than in the material comprising PCB 180. This greater CTE of the material comprising component 185 may cause the component pins to spread farther apart in relation to one another, thereby increasing the pitch value of the component pins beyond the pitch value of the electrically conductive pads. In the equation above, the pitch value of the electrically conductive pads ($L_{PCB}$) may be determined by summing the pitch value of the component pins of component 185 ($L_{component}$) and the product indicating a potential misalignment between the electrically conductive pads and the component pins ($\Delta CTE \times L_{component} \times \Delta T$). Upon determining the pitch value of PCB 180 that compensates for thermal expansion caused by the soldering process, the electrically conductive pads may be disposed on a surface of PCB 180 accordingly. It is noted that if the CTE of the material comprising PCB 180 and the CTE of the material comprising component 185 are equal, $\Delta CTE=0$ and $L_{component}=L_{PCB}$ indicating that the pitch value of PCB 180 does not require compensation for thermal expansion.

Figure 2A:
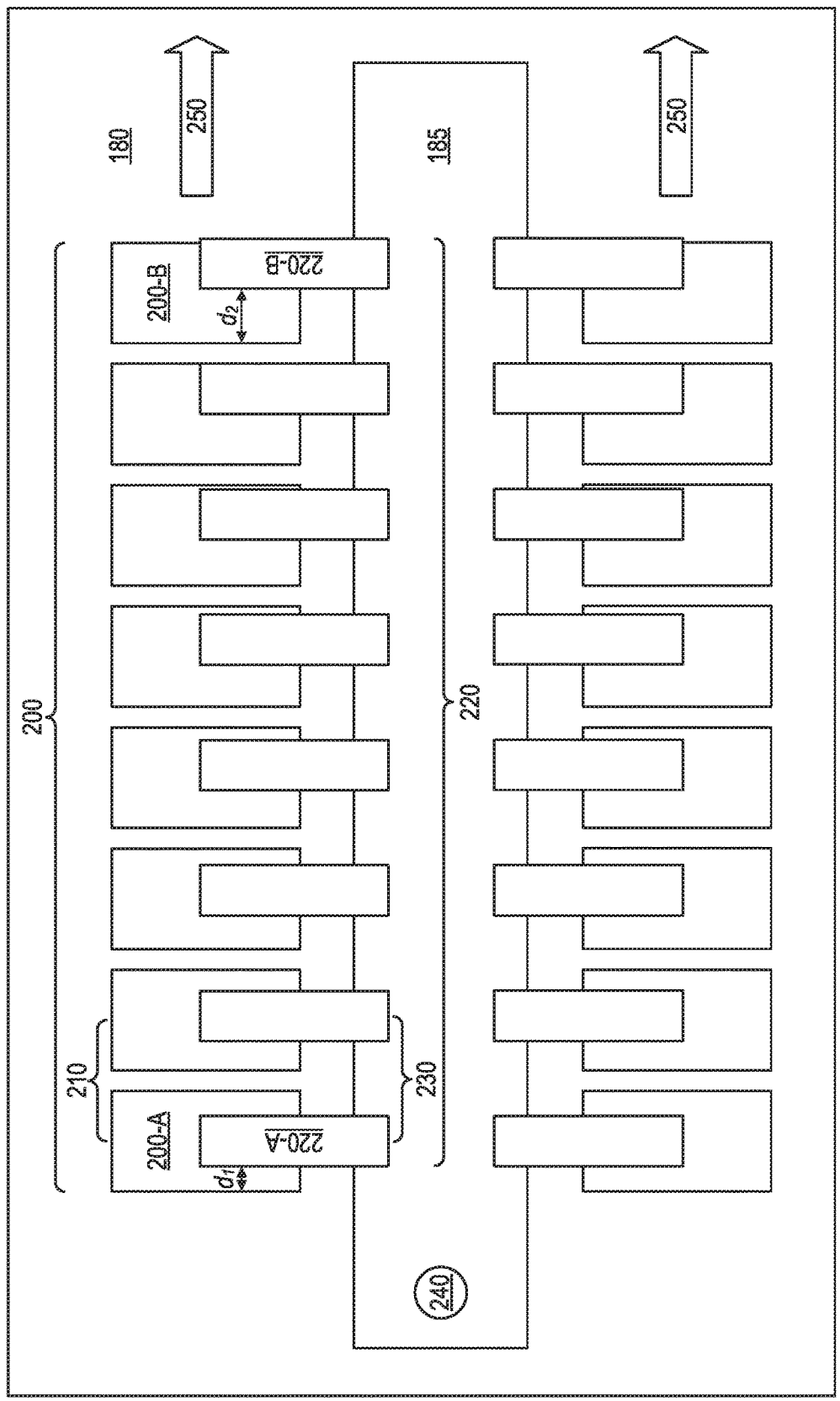
FIGS. 2A and 2B are block diagrams of selected elements of an embodiment of a PCB and a component having an alignment pin disposed proximate to an edge of the component.
Figure 2B:
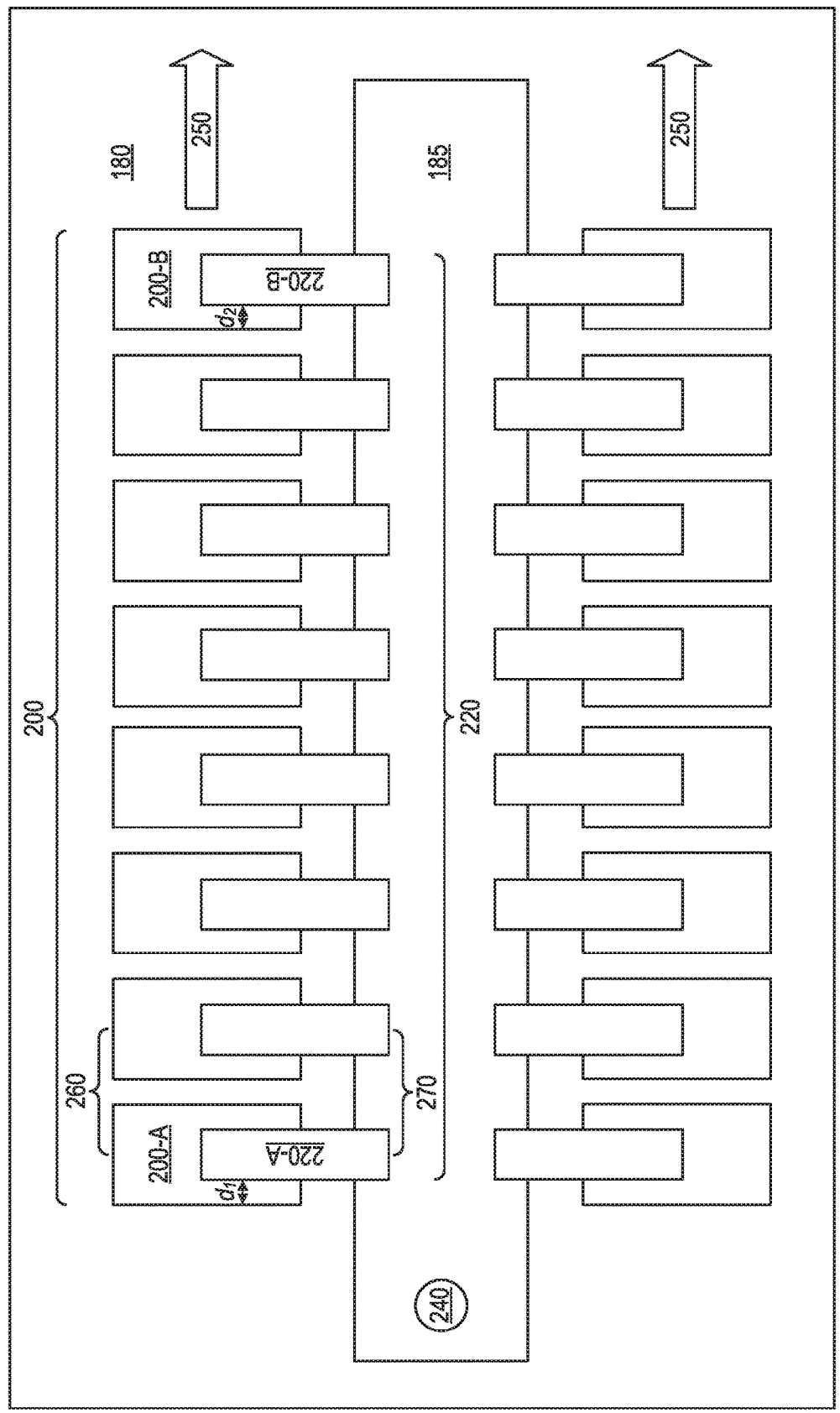

FIGS. 2A and 2B are block diagrams of selected elements of an embodiment of a PCB and a component having an alignment pin disposed proximate to an edge of the component. In the embodiment illustrated in FIGS. 2A and 2B, a top view of component 185 and PCB 180 is shown. Alignment pin 240 is disposed proximate to a left edge of component 185 thereby aligning component 185 with PCB 180 and component pins 220 extend orthogonally from two sides of component 185. Component pins 220 are disposed evenly along both sides of component 185 such that adjacent component pins 220 share the same pitch value 230. In the embodiment illustrated in FIGS. 2A and 2B, the CTE of the material comprising PCB 180 is greater than the CTE of the material comprising component 185. It is noted that the length of component 185 and the number of component pins 220 illustrated in FIGS. 2A and 2B may be limited for illustrative purposes. In other embodiments, component 185 may be of a shorter or longer length, different spatial dimensions, and/or include additional or fewer component pins 220. In addition, various elements (e.g., electrically conductive pads 200, component pins 220, and the like) have been labeled for only an upper portion of FIGS. 2A and 2B to avoid clutter. However, it is noted that the concepts described herein with respect to the labeled elements apply similarly to the corresponding unlabeled elements in the lower portions of FIGS. 2A and 2B.

FIG. 2A illustrates selected elements of a PCB and a component having misaligned electrically conductive pads and component pins. In particular, FIG. 2A illustrates PCB 180 and component 185 having misaligned electrically conductive pads 200 and component pins 220 at a room temperature (e.g., 25° C.) prior to undergoing a reflow soldering process. As illustrated in FIG. 2A, electrically conductive pads 200 of PCB 180 are disposed on a surface of PCB 180 (i.e., underneath component pins 220). Electrically conductive pads 200 share a pitch value 210 that is less than the pitch value 230 of component pins 220, resulting in a tighter clustering of electrically conductive pads 200 than that of component pins 220 above. In particular, electrically conductive pads 200 have been disposed on the surface of PCB 180 with a pitch value 210 in accordance with the equations above. Because the CTE of the material comprising PCB 180 is greater than the CTE of the material comprising component 185, pitch value 210 is less than pitch value 230 to compensate for a greater thermal expansion in PCB 180 than in component 185. As illustrated in FIG. 2A, electrically conductive pads 200 have been disposed such that electrically conductive pad 200-A is approximately aligned with component pin 220-A, having a distance $d_1$ between the left edges of electrically conductive pad 200-A and component pin 220-A. Here, electrically conductive pad 200-A is approximately aligned with component pin 220-A because thermal expansion may cause PCB 180 to expand outwardly away from alignment pin 240 in the direction indicated by arrow 250. In contrast, electrically conductive pad 200-B is misaligned with component pin 220-B, having a distance $d_2$ between the left edges of electrically conductive pad 200-B and component pin 220-B. Here, $d_2 \gg d_1$ to compensate for thermal expansion as PCB 180 expands outwardly away from alignment pin 240 in the direction indicated by arrow 250, thus minimizing $d_2$ to align electrically conductive pad 200-B with component pin 220-B.

FIG. 2B illustrates selected elements of a PCB and a component having aligned electrically conductive pads and component pins. In particular, FIG. 2B illustrates PCB 180 and component 185 having aligned electrically conductive pads 200 and component pins 220 at a soldering temperature (e.g., 220° C.) during a reflow soldering process. As shown in FIG. 2B, PCB 180 has expanded outwardly away from alignment pin 240 in the direction indicated by arrow 250 due to thermal expansion induced by the reflow soldering process. Specifically, the change in temperature from room temperature (e.g., 25° C.) to soldering temperature (e.g., 220° C.) has caused the pitch value 260 of electrically conductive pads 200 to increase from the pitch value 210 at room temperature illustrated in FIG. 2A. Similarly, the change in temperature has caused the pitch value 270 to increase from the pitch value 230 at room temperature illustrated in FIG. 2A. As a result of thermal expansion, electrically conductive pad 200-B and component pin 220-B are in proper alignment during the soldering process and distance $d_2$ is approximately equal to $d_1$, thereby aligning electrically conductive pads 200 with component pins 220. When the soldering temperature cools to return to room temperature, PCB 180 and component 185 will retract in dimension and electrically conductive pads 200 will remain in proper alignment with component pins 220 thereby ensuring the reliability of the overall circuit.

Figure 3A:
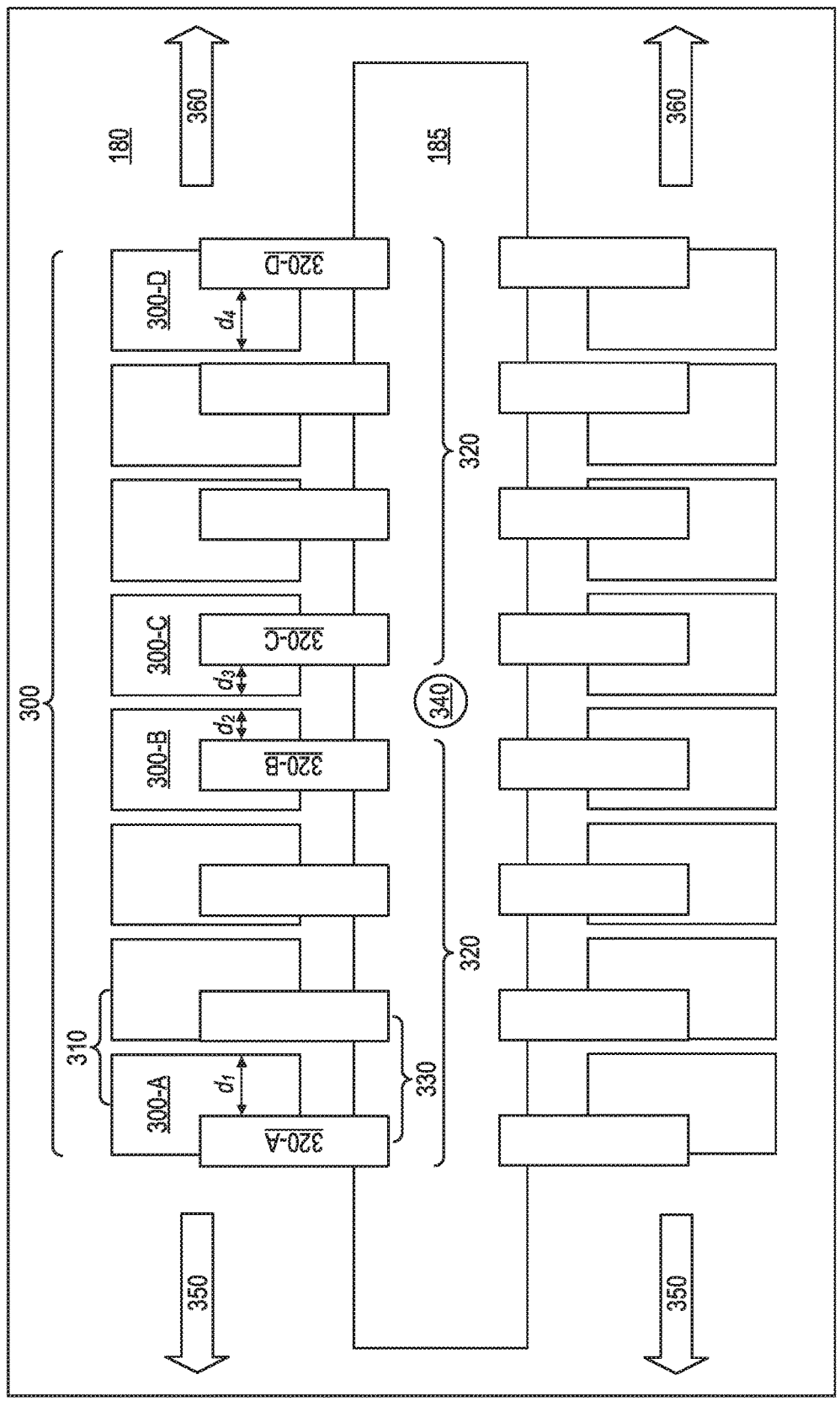
FIGS. 3A and 3B are block diagrams of selected elements of an embodiment of a PCB and a component having an alignment pin disposed proximate to a center of the component.
Figure 3B:
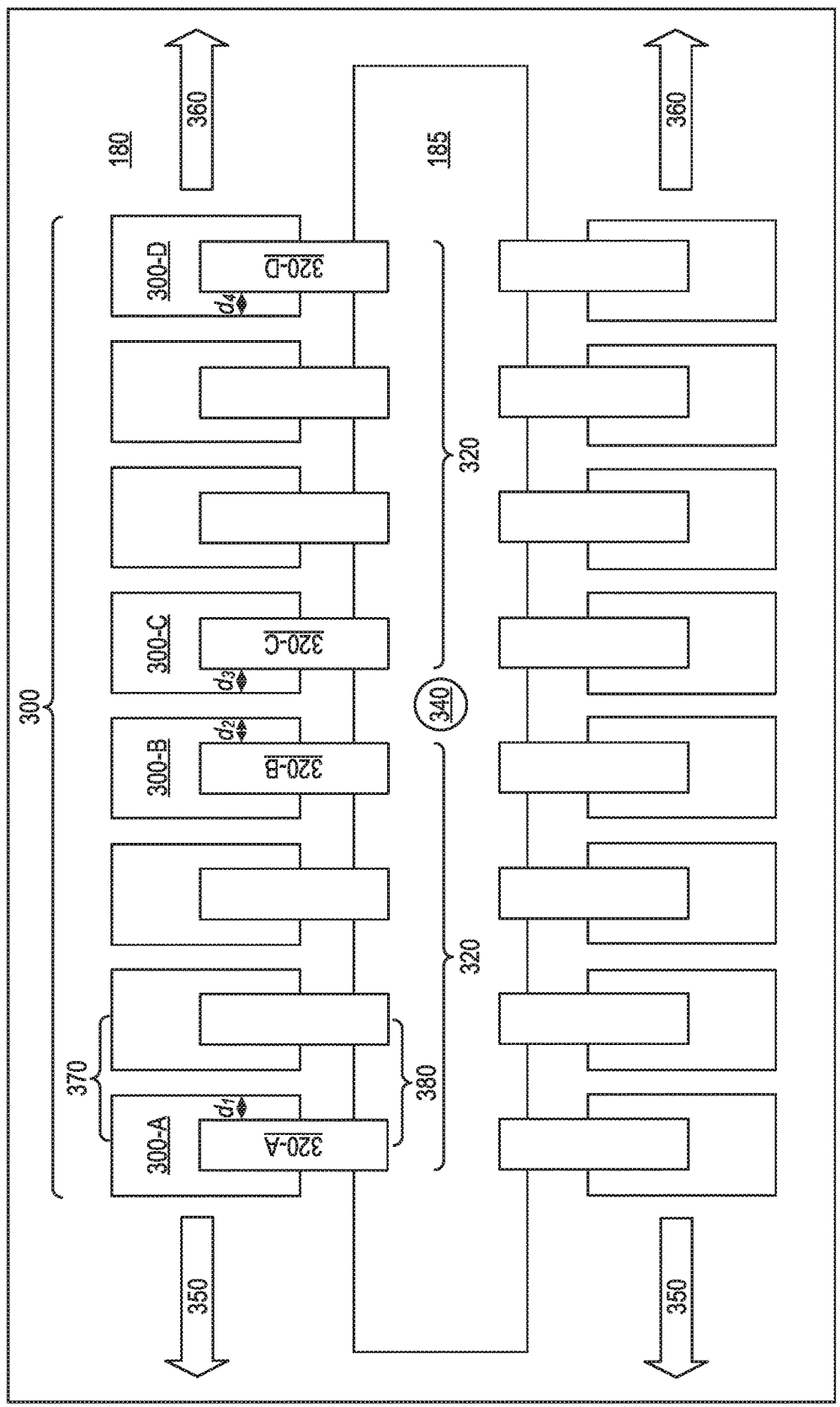

FIGS. 3A and 3B are block diagrams of selected elements of an embodiment of a PCB and a component having an alignment pin disposed proximate to a center of the component. In the embodiment illustrated in FIGS. 3A and 3B, a top view of component 185 and PCB 180 is shown. Alignment pin 340 is disposed proximate to a center of component 185 thereby aligning component 185 with PCB 180 and component pins 320 extend orthogonally from two sides of component 185. Component pins 320 are disposed evenly along both sides of component 185 such that adjacent component pins 320 share the same pitch value 330. In the embodiment illustrated in FIGS. 3A and 3B, the CTE of the material comprising PCB 180 is greater than the CTE of the material comprising component 185. It is noted that the length of component 185 and the number of component pins 320 illustrated in FIGS. 3A and 3B may be limited for illustrative purposes. In other embodiments, component 185 may be of a shorter or longer length, different spatial dimensions, and/or include additional or fewer component pins 320. In addition, various elements (e.g., electrically conductive pads 310, component pins 320, and the like) have been labeled for only an upper portion of FIGS. 3A and 3B to avoid cutter. However, it is noted that the concepts described herein with respect to the labeled elements apply similarly to the corresponding unlabeled elements in the lower portions of FIGS. 3A and 3B.

FIG. 3A illustrates selected elements of a PCB and a component having misaligned electrically conductive pads and component pins. Specifically, FIG. 3A illustrates PCB 180 and component 185 having misaligned electrically conductive pads 300 and component pins 320 at a room temperature (e.g., 25° C.) prior to undergoing a reflow soldering process. As illustrated in FIG. 3A, electrically conductive pads 300 of PCB 180 are disposed on a surface of PCB 180 (i.e., underneath component pins 320). Electrically conductive pads 300 share a pitch value 310 that is less than the pitch value 330 of component pins 320, resulting in a tighter clustering of electrically conductive pads 300 than that of component pins 320 above. In particular, electrically conductive pads 300 have been disposed on the surface of PCB 180 with a pitch value 310 in accordance with the equations above. Because the CTE of the material comprising PCB 180 is greater than the CTE of the material comprising component 185, pitch value 310 is less than pitch value 330 to compensate for a greater thermal expansion in PCB 180 than in component 185. As illustrated in FIG. 3A, electrically conductive pads 300 have been disposed such that electrically conductive pad 300-B is approximately aligned with component pin 320-B, having a distance $d_2$ between the right edges of electrically conductive pad 300-B and component pin 320-B. Similarly, electrically conductive pad 300-C is approximately aligned with component pin 320-C, having a distance $d_3$ between the left edges of electrically conductive pad 300-C and component pin 320-C. Here, electrically conductive pads 300-B and 300-C are approximately aligned with component pins 320-B and 320-C, respectively, because thermal expansion may cause PCB 180 to expand outwardly away from alignment pin 340 in the directions indicated by arrows 350 and 360. In contrast, electrically conductive pad 300-A is misaligned with component pin 320-A, having a distance $d_1$ between the right edges of electrically conductive pad 300-A and component pin 320-A. Similarly, electrically conductive pad 300-D is misaligned with component pin 320-D, having a distance $d_4$ between the left edges of electrically conductive pad 300-D and component pin 320-D. Here, $d_1 \gg d_2$ and $d_4 \gg d_3$ to compensate for thermal expansion as PCB 180 expands outwardly away from alignment pin 340 in the directions indicated by arrows 350 and 360, thus minimizing $d_1$ and $d_4$ to align electrically conductive pads 300-A and 300-D with component pins 320-A and 320-D, respectively.

FIG. 3B illustrates selected elements of a PCB and a component having aligned electrically conductive pads and component pins. Specifically, FIG. 3B illustrates PCB 180 and component 185 having aligned electrically conductive pads 300 and component pins 320 at a soldering temperature (e.g., 220° C.) during a reflow soldering process. As shown in FIG. 3B, PCB 180 has expanded outwardly away from alignment pin 340 in the directions indicated by arrows 350 and 360 due to thermal expansion induced by the reflow soldering process. In particular, the change in temperature from room temperature (e.g., 25° C.) to soldering temperature (e.g., 220° C.) has caused the pitch value 370 of electrically conductive pads 300 to increase from the pitch value 310 at room temperature illustrated in FIG. 3A. Similarly, the change in temperature has caused the pitch value 380 to increase from the pitch value 330 at room temperature illustrated in FIG. 3A. As a result of thermal expansion, electrically conductive pads 300-A and 300-D are in proper alignment with component pins 320-A and 320-D, respectively. In addition, distances $d_1$, $d_2$, $d_3$, and $d_4$, are approximately equal, thereby aligning electrically conductive pads 300 with component pins 320 during the soldering process. When the soldering temperature cools to return to room temperature, PCB 180 and component 185 will retract in dimension and electrically conductive pads 300 will remain in proper alignment with component pins 320 thereby ensuring the reliability of the overall circuit.

FIG. 4 is a flowchart depicting selected elements of an embodiment of a method for compensating for thermal expansion caused by a soldering process. It is noted that certain operations described in method 400 may be optional or may be rearranged in different embodiments.

Method 400 may begin at step 410, where method 400 includes identifying a first coefficient of thermal expansion (CTE) for a first material of a first component. The first component may include component pins having a first pitch value. In step 420, method 400 includes identifying a second CTE for a second material of a second component. The second component may be associated with electrically conductive pads. In step 430, method 400 includes determining a relative expansion value of the first component and the second component based on the first CTE and the second CTE. In step 440, method 400 includes determining a change in temperature value of the first component and the second component. The change in temperature value may indicate a change in temperature caused by the soldering process. In step 450, method 400 includes determining a second pitch value for the electrically conductive pads of the second component. The second pitch value may be based on a product of the relative expansion value, the first pitch value, and the change in temperature value and cause an alignment between the component pins and the electrically conductive pads during the soldering process.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for compensating for thermal expansion caused by a soldering process, the method comprising:
   identifying a first coefficient of thermal expansion (CTE) for a first material of a first component, the first component including a plurality of component pins having a first pitch value;
   identifying a second CTE for a second material of a second component, the second component associated with a plurality of electrically conductive pads;
   determining a relative expansion value based on the first CTE and the second CTE;
   determining a change in temperature value of the first component and the second component, the change in temperature value indicating a change in temperature caused by the soldering process; and
   determining a second pitch value for the plurality of electrically conductive pads based on a product of the relative expansion value, the first pitch value, and the change in temperature value, the second pitch value causing an alignment between the plurality of component pins and the plurality of electrically conductive pads during the soldering process.

2. The method of claim 1, further comprising:
   disposing the plurality of electrically conductive pads on a surface of the second component based on the second pitch value.

3. The method of claim 1, wherein determining the relative expansion value comprises:
   determining a difference between the first CTE and the second CTE.

4. The method of claim 1, wherein determining the change of temperature value comprises:
   determining a difference between a first temperature value and a second temperature value, the first temperature value associated with a room temperature, the second temperature value associated with the soldering process.

5. The method of claim 1, wherein determining the second pitch value comprises:
   determining that the second CTE is greater than the first CTE; and
   in response to determining that the second CTE is greater than the first CTE, subtracting the product from the first pitch value.

6. The method of claim 1, wherein determining the second pitch value comprises:
   determining that the second CTE is less than the first CTE; and
   in response to determining that the second CTE is less than the first CTE, adding the product to the first pitch value.

7. The method of claim 1, wherein the first component is a surface-mount electronic component.

8. The method of claim 1, wherein the second component is a printed circuit board (PCB).

9. An information handling system, comprising:
   a processor;
   a first component;
   a second component; and
   a memory medium coupled to the processor that includes instructions executed by the processor causing the information handling system to:
      identify a first coefficient of thermal expansion (CTE) for a first material of the first component, the first component including a plurality of component pins having a first pitch value;
      identify a second CTE for a second material of the second component, the second component associated with a plurality of electrically conductive pads;
      determine a relative expansion value based on the first CTE and the second CTE;
      determine a change in temperature value of the first component and the second component, the change in temperature value indicating a change in temperature caused by the soldering process; and
      determine a second pitch value for the plurality of electrically conductive pads based on a product of the relative expansion value, the first pitch value, and the change in temperature value, the second pitch value causing an alignment between the plurality of component pins and the plurality of electrically conductive pads during the soldering process.

10. The information handling system of claim 9, wherein to determine the relative expansion value, the instructions further cause the information handling system to:
    determine a difference between the first CTE and the second CTE.

11. The information handling system of claim 9, wherein to determine the change of temperature value, the instructions further cause the information handling system to:
    determine a difference between a first temperature value and a second temperature value, the first temperature value associated with a room temperature, the second temperature value associated with the soldering process.

12. The information handling system of claim 9, wherein to determine the second pitch value, the instructions further cause the information handling system to:
    determining that the second CTE is greater than the first CTE; and
    in response to determining that the second CTE is greater than the first CTE, subtract the product from the first pitch value.

13. The information handling system of claim 9, wherein to determine the second pitch value, the instructions further cause the information handling system to:
    determine that the second CTE is less than the first CTE; and
    in response to determining that the second CTE is less than the first CTE, add the product to the first pitch value.

14. The information handling system of claim 9, wherein the first component is a surface-mount component.

15. The information handling system of claim 9, wherein the second component is a printed circuit board (PCB).

16. A computer-readable non-transitory memory medium that includes instructions executed by a processor of an information handling system causing the information handling system to:
- identify a first coefficient of thermal expansion (CTE) for a first material of a first component, the first component including a plurality of component pins having a first pitch value;
- identify a second CTE for a second material of a second component, the second component associated with a plurality of electrically conductive pads;
- determine a relative expansion value based on the first CTE and the second CTE;
- determine a change in temperature value of the first component and the second component, the change in temperature value indicating a change in temperature caused by the soldering process; and
- determine a second pitch value for the plurality of electrically conductive pads based on a product of the relative expansion value, the first pitch value, and the change in temperature value, the second pitch value causing an alignment between the plurality of component pins and the plurality of electrically conductive pads during the soldering process.

17. The computer-readable non-transitory memory medium of claim 16, wherein to determine the relative expansion value, the instructions further cause the information handling system to:
- determine a difference between the first CTE and the second CTE.

18. The computer-readable non-transitory memory medium of claim 16, wherein to determine the change of temperature value, the instructions further cause the information handling system to:
- determine a difference between a first temperature value and a second temperature value, the first temperature value associated with a room temperature, the second temperature value associated with the soldering process.

19. The computer-readable non-transitory memory medium of claim 16, wherein to determine the second pitch value, the instructions further cause the information handling system to:
- determine that the second CTE is greater than the first CTE; and
- in response to determining that the second CTE is greater than the first CTE, subtract the product from the first pitch value.

20. The computer-readable non-transitory memory medium of claim 16, wherein to determine the second pitch value, the instructions further cause the information handling system to:
- determine that the second CTE is less than the first CTE; and
- in response to determining that the second CTE is less than the first CTE, add the product to the first pitch value.

* * * * *